Feb. 13, 1934.  G. E. LITTLE  1,946,497
TRAILER ATTACHMENT FOR MOTOR BOATS
Filed May 11, 1932   2 Sheets-Sheet 1
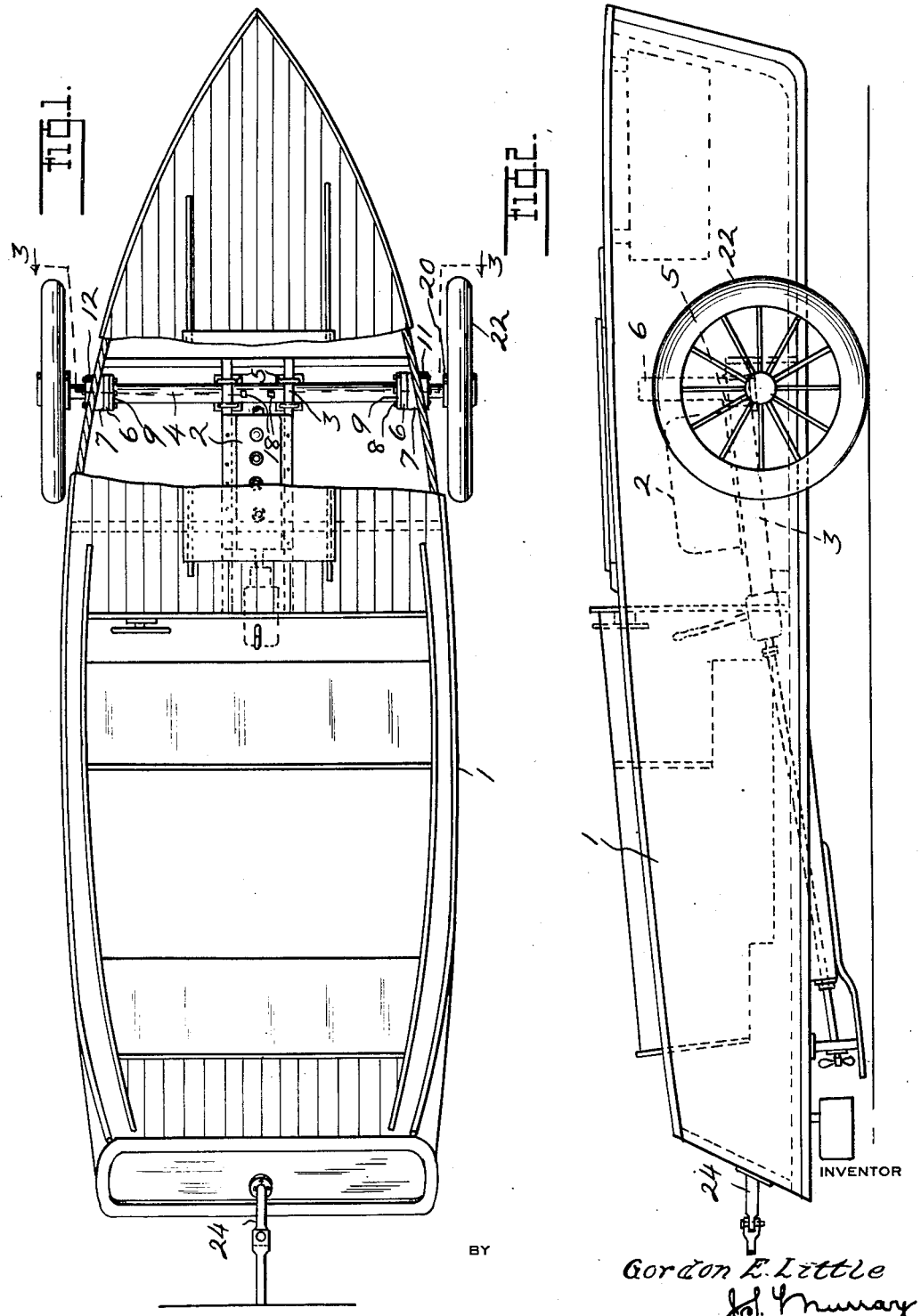
INVENTOR
Gordon E. Little
ATTORNEY Feb. 13, 1934.   G. E. LITTLE   1,946,497
TRAILER ATTACHMENT FOR MOTOR BOATS
Filed May 11, 1932   2 Sheets-Sheet 2
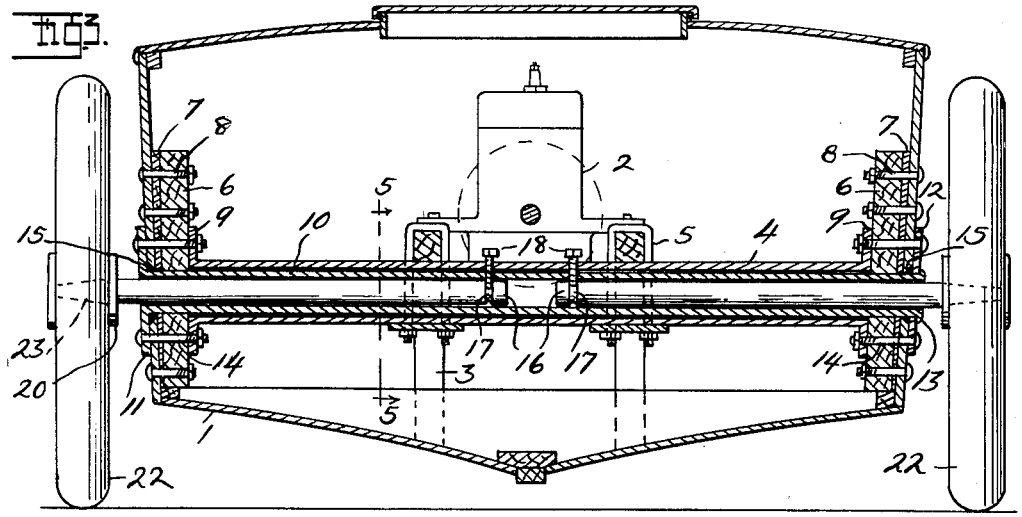
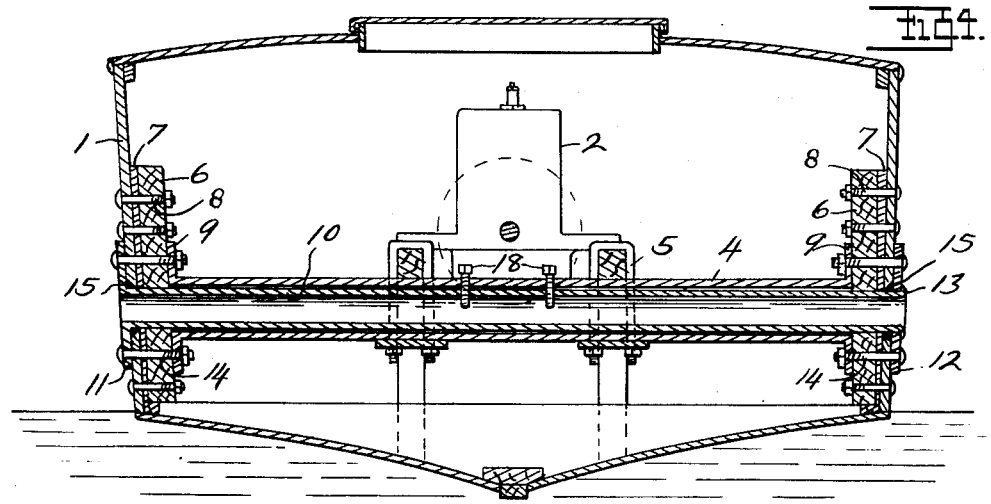
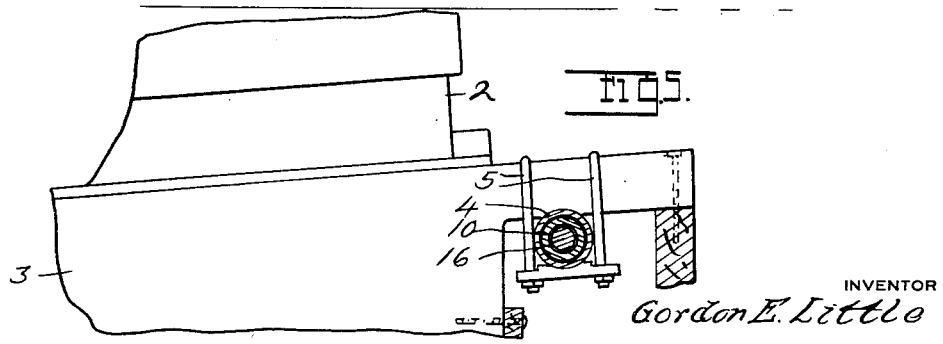
INVENTOR
Gordon E. Little
BY
J. S. Murray
ATTORNEY Patented Feb. 13, 1934

1,946,497

UNITED STATES PATENT OFFICE 1,946,497

TRAILER ATTACHMENT FOR MOTOR BOATS

Gordon E. Little, Roseville, Mich.

Application May 11, 1932. Serial No. 610,635

7 Claims. (Cl. 9—1)

This invention relates to boats, and particularly to the attachment of road wheels to boats to facilitate transportation to and from the water.

An expense ordinarily incident to ownership of a boat (and more particularly a motor boat) is maintenance of a boat well. This item, however, may be eliminated by transporting the boat to and from the owner's home, or such other place of storage as may be available to the owner. Also, it is frequently desirable to transport a boat from one body of water to another, particularly on pleasure trips.

It is an object of the present invention to provide for the quick and convenient connection of a pair of ground wheels to a boat, to adapt it for convenient transportation across country as a motor vehicle trailer, said wheels being readily removable at the water's edge.

Another object is to position a wheel and axle mounting on a boat without interrupting the stream lines or restricting the passenger and storage space.

Still another object is to so attach a wheel and axle mounting to a boat as to materially brace the hull.

A further object is to provide for the ready attachment or removal of said wheels by one person, without assistance.

A still further object is to adapt the wheels to be applied and removed when the boat is afloat without necessity of the operator either getting into or reaching into the water.

These and various other objects the invention attains by the construction hereinafter described, and illustrated in the accompanying drawings, wherein:

Fig. 1 is a plan view of a motor boat equipped with wheels for trailer engagement with a vehicle.

Fig. 2 is a side elevational view of the same.

Fig. 3 is a cross sectional view of the same, taken upon the line 2—2 of Fig. 1.

Fig. 4 is a similar view, showing the boat positioned in water with the wheels removed.

Fig. 5 is a sectional detail, taken upon the line 5—5 of Fig. 3.

In these views, the reference character 1 designates a motor boat, the motor 2 of which is seated upon the usual base frame 3 raised slightly above the boat bottom. In installing the present invention, the pipe 4 is transversely positioned within the boat beneath the frame 3, and is rigidly clamped to said frame by U bolts 5 or the like.

The ends of said pipe are engaged with a pair of wooden uprights 6, which may lie against the sides of the boat if said sides are parallel. In case the sides are upwardly divergent, as in the illustrated construction, suitable wooden wedges 7 may be inserted between the uprights and boat sides (see Fig. 3). Said uprights are preferably coextensive in height with the boat sides, and are rigidly bolted to the latter, as indicated at 8. It is preferred to provide annular flanges 9 in rigid exterior engagement with the ends of the pipe 4, abutting against the uprights 6.

Snugly fitted within the pipe 4 is a slightly smaller pipe 10, terminally projecting beyond the pipe 4 and passing snugly through suitable openings formed for that purpose in the uprights 6 and boat sides. The ends of the pipe 10 respectively rigidly carry collars 11 and 12 exteriorly abutting the sides of the boat, the collar 11 being welded or otherwise permanently and rigidly secured to the pipe and the collar 12 being held in place by a terminal upsetting of the pipe, as indicated at 13.

A plurality of bolts 14 passing through the sides of the boat and uprights 6 connect the flanges 9 to the collars 11 and 12. When the nuts on these bolts are suitably tightened, the sides of the boat and the uprights 6 are clamped firmly against the flanges 9, strongly bracing and reinforcing the boat.

To prevent any leakage of water through the openings accommodating the pipe 10, it is preferred to compress packing 15 around said pipe between the boat sides and the collars 11 and 12, and to cause such packing to more firmly engage the pipe 10, it is preferred to chamfer the outer faces of the boat sides marginally of the pipe-receiving openings, as clearly appears in Figs. 3 and 4.

The pipe 10 receives a two-part axle 16, the sections whereof are inserted from opposite sides of the boat. Each of said sections is formed with an annular groove 17, and a pair of set screws 18 threaded into the pipes 4 and 10 are engageable in said grooves to retain the axle from endwise shifting. The outer portion of each axle section is formed with an annular flange 20, providing a shoulder for positioning a wheel 22, journaled upon the customary tapered spindle 23 extending outwardly from such shoulder.

In the use of the described invention, the boat 1 may be kept by its owner in his garage or any other available storage place without regard to its proximity to water. When in storage, there will ordinarily be no object in removing the wheels 22. In transit to or from water, the boat is connected to the rear end of a motor vehicle, like any trailer. A suitable fitting 24 may be permanently secured to the stern of the boat for engagement by a draw bar. At the water's edge, the motor vehicle is turned to direct the bow of the boat toward the water, and is then rearwardly driven to launch the boat. The draw bar is then disconnected, and the set screws 18 are loosened sufficiently to permit free withdrawal of the axle sections. In effecting such withdrawal, the boat may be pushed out from shore sufficiently to clear the wheels from the bottom, and an adequate lateral pressure may then be successively applied to the wheels by an oar or the like.

In replacing the wheels, the bow of the boat may be driven up on shore and held raised in any suitable manner, while the axle sections are inserted in the pipe 10. If, however, the replacement is to be performed by only one person, it may be preferable to insert the axle sections successively in place while the boat is in shallow water.

The described construction will in most cases materially reduce the expense of maintaining a motor boat, and presents the advantages of not only avoiding leakage and avoiding restriction of the passenger and storage space, but of actually reinforcing and strengthening the boat, in view of the bracing effect of the pipe 4.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. In a device of the character described, the combination with a boat, of an inner and an outer tubular member extended within the boat transversely thereof, filler members interposed between the ends of the outer tubular member and the sides of the boat, the inner tubular member terminally extending through said filler members and through the sides of the boat, an axle positioned within the inner tubular member, a pair of ground wheels carried by said axle at opposite sides of the boat, and means normally restraining said axle from movement lengthwise of said tubular members.

2. In a device of the character described, the combination with a boat, of an inner and outer tubular member extending within the boat transversely thereof, a pair of filler members interposed between the sides of the boat and the outer tubular member, the inner tubular member terminally extending through the sides of the boat, flanges carried by the outer tubular member in interior proximity to the sides of the boat, flanges carried by the inner tubular member exteriorly of the boat and adjacent to its sides, clamping connections extending through the sides of the boat and connecting said interior and exterior flanges, an axle positioned within the inner tubular member, and a pair of ground wheels journaled on said axle at opposite sides of the boat.

3. In a device of the character described, the combination with a boat, of an outer tubular member extending within the boat, between its sides, an inner tubular member projecting beyond the ends of the outer tubular member and through the sides of the boat, a common means for rigidly securing the corresponding ends of said tubular members to the sides of the boat, a pair of axle sections within the inner tubular member, projecting from the ends thereof, a pair of ground wheels carried by the projecting ends of said axle sections, and means for releasably securing the axle sections in the inner tubular member.

4. In a device of the character described, the combination with a boat, of a tubular member extending within and transversely of the boat, filler members between the sides of the boat and said tubular member, wedges driven between the sides of the boat and said filler members, a pair of axle sections within said tubular member, projecting beyond said tubular member and through the sides of the boat, a pair of wheels mounted upon said axle sections, one at each side of the boat, and means releasably securing said axle sections within said tubular member.

5. In a device of the character described, the combination with a boat, of an axle carried by and within said boat, formed in two sections projecting through and removable from opposite sides of the boat, a pair of ground wheels terminally carried by said axle exteriorly of the boat, and means within the boat normally maintaining substantial alignment of the wheel-carrying terminals of said axle.

6. In a device of the character described, the combination with a boat having an opening in its top, of an axle carried by and within said boat, below said top opening, and projecting through the sides of the boat, a pair of ground wheels terminally carried by said axle exteriorly of the boat, and means operable from within the boat and accessible through said top opening, engageable with and disengageable from said axle to restrain it from longitudinal shifting.

7. In a device of the character described, the combination with a boat having an opening in its top, of a tubular member extended within the boat, transversely thereof, means rigidly securing said tubular member to the sides of the boat, an axle comprising two sections inserted in said tubular member and projecting through the sides of the boat, a pair of ground wheels carried by said axle sections at opposite sides of the boat, and means carried by said tubular member and accessible through said top opening, detachably engaging said axle sections and restraining said sections from longitudinal shifting in the tubular member.

GORDON E. LITTLE.